(12) United States Patent
Viaud et al.

(10) Patent No.: US 7,162,951 B2
(45) Date of Patent: Jan. 16, 2007

(54) ROUND BALER

(75) Inventors: Jean Viaud, Gray (FR); Emmanuel Chapon, Champvans (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/109,079

(22) Filed: Apr. 19, 2005

(65) Prior Publication Data

US 2005/0241499 A1    Nov. 3, 2005

(30) Foreign Application Priority Data

Apr. 23, 2004   (EP)   ................................. 04101713

(51) Int. Cl.
  *B30B 5/04*       (2006.01)
  *A01D 39/00*     (2006.01)
(52) U.S. Cl. .............................. 100/87; 100/88; 56/341
(58) Field of Classification Search .................... 100/5, 100/87, 88, 89; 56/341, 344; 53/211, 215, 53/216, 587
See application file for complete search history.

(56) References Cited

U.S. PATENT DOCUMENTS

| 3,911,641 | A | * | 10/1975 | Miller et al. .................. 53/415 |
| 4,121,513 | A | * | 10/1978 | Kopaska ....................... 100/88 |
| 5,839,362 | A | * | 11/1998 | Ratzlaff et al. ............... 100/88 |
| 6,079,324 | A | * | 6/2000 | Feraboli et al. ............... 100/40 |
| 6,622,468 | B1 | * | 9/2003 | Lucand et al. ................ 56/341 |
| 6,640,699 | B1 | * | 11/2003 | Viaud ............................ 100/7 |
| 2004/0031402 | A1 | * | 2/2004 | Viaud .......................... 100/88 |

FOREIGN PATENT DOCUMENTS

| EP | 0 309 936 | 9/1988 |
| EP | 0 309 941 | 9/1988 |
| EP | 1 080 627 | 8/2000 |
| EP | 1 308 078 | 9/2002 |
| EP | 1 308 079 | 9/2002 |
| FR | 2 793 382 | 5/1999 |

* cited by examiner

*Primary Examiner*—Lowell A. Larson
*Assistant Examiner*—Jimmy T. Nguyen

(57) ABSTRACT

A round baler is provided with a single set of baling means like belts, which are trained over a series of fixed and mobile rolls. In order to form a bale of a large diameter several loops are formed in said baling means, which loops are controlled by two pivot arms. One of the pivot arms partially coincides with the potential bale chamber. As a result, the pivot arm does not extend beyond the boarder of the side structure during its movement.

12 Claims, 8 Drawing Sheets

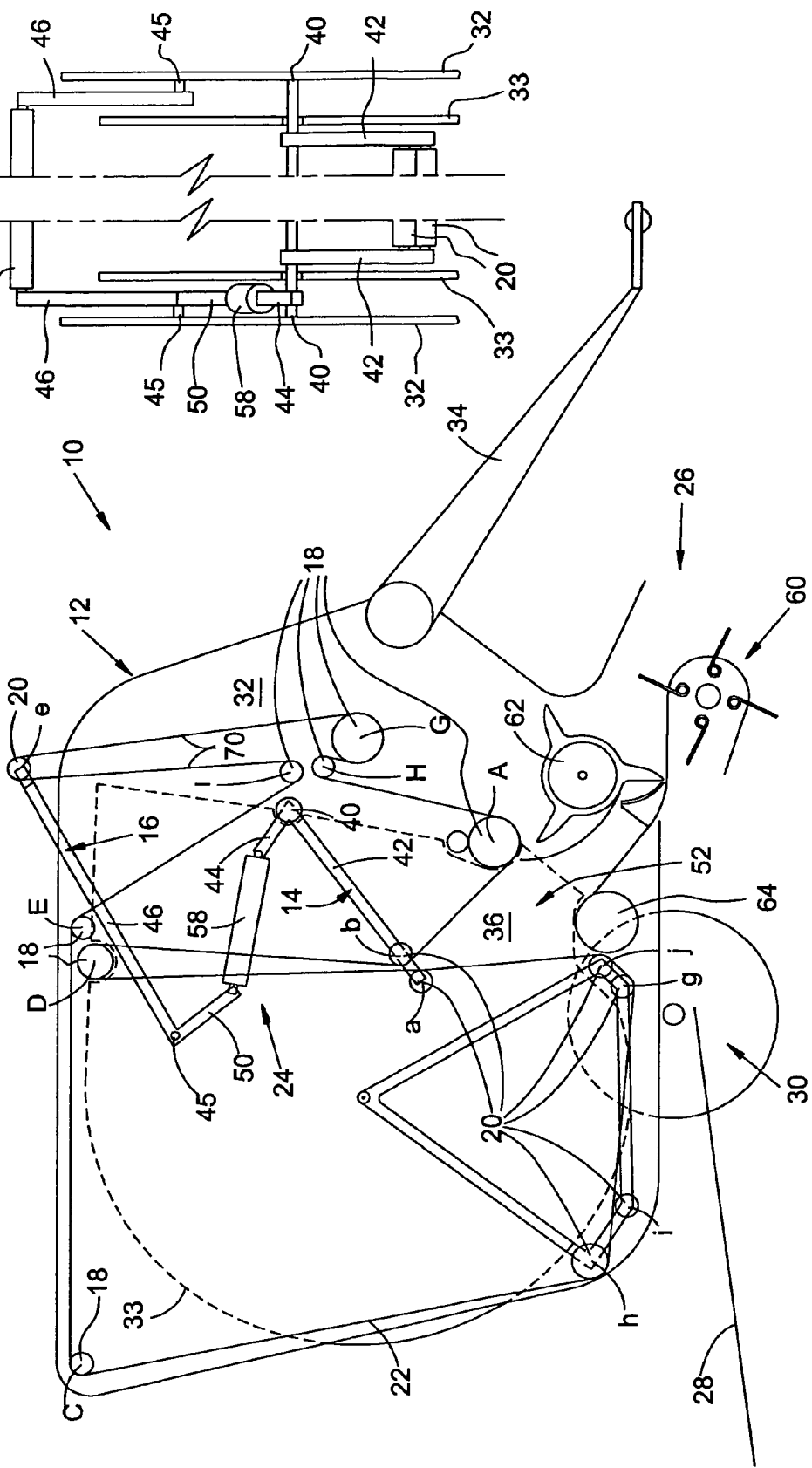

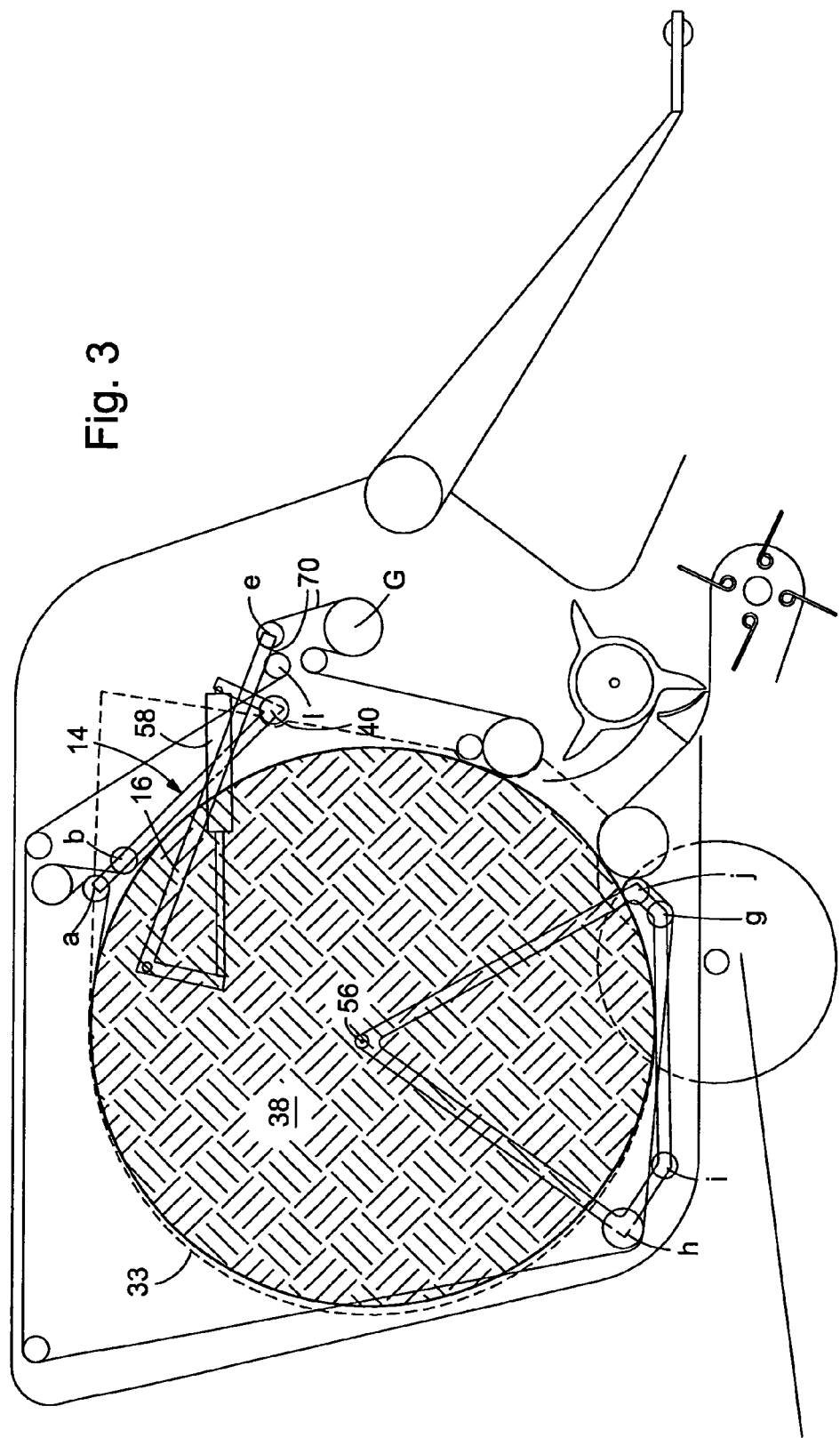

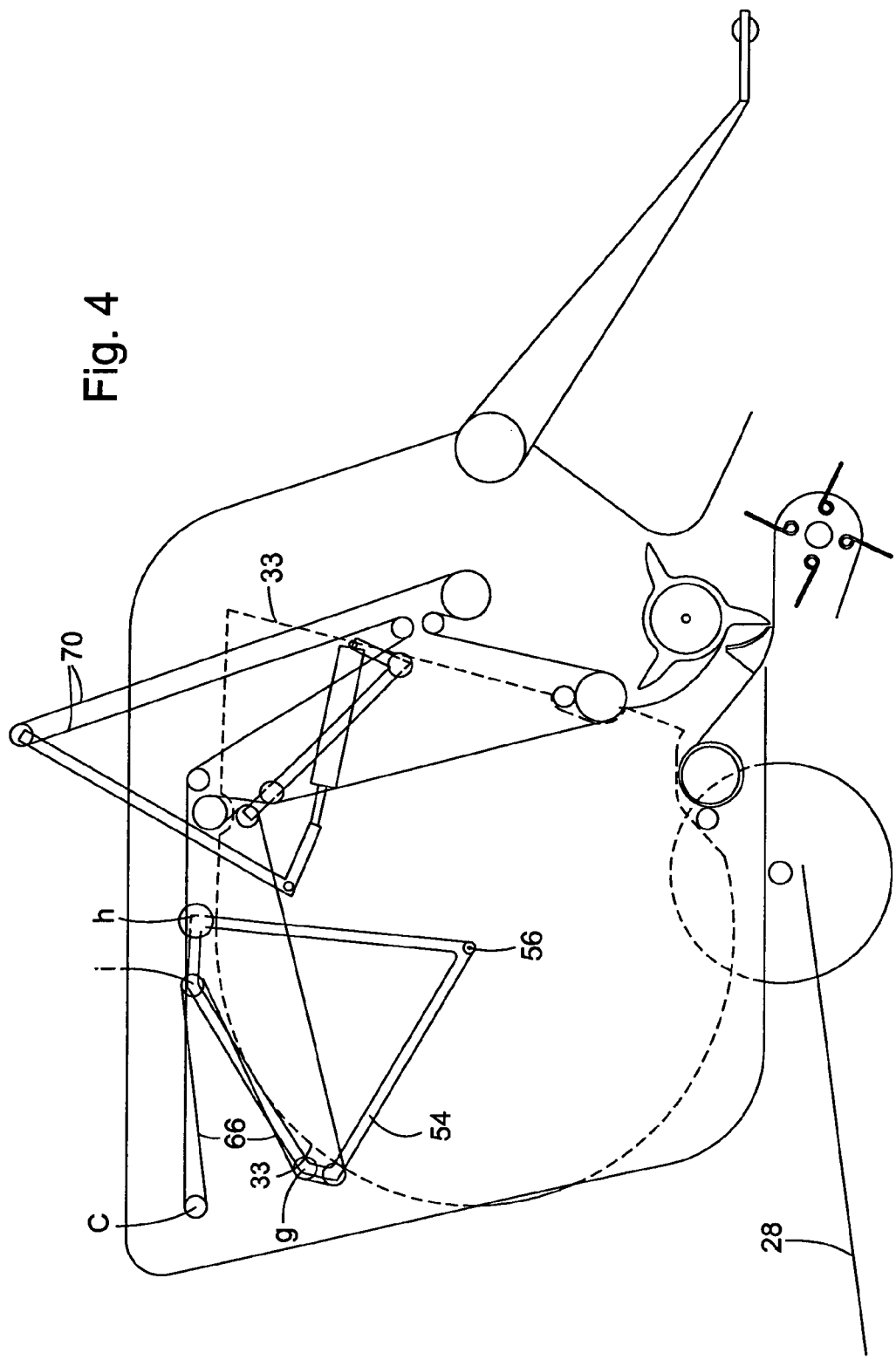

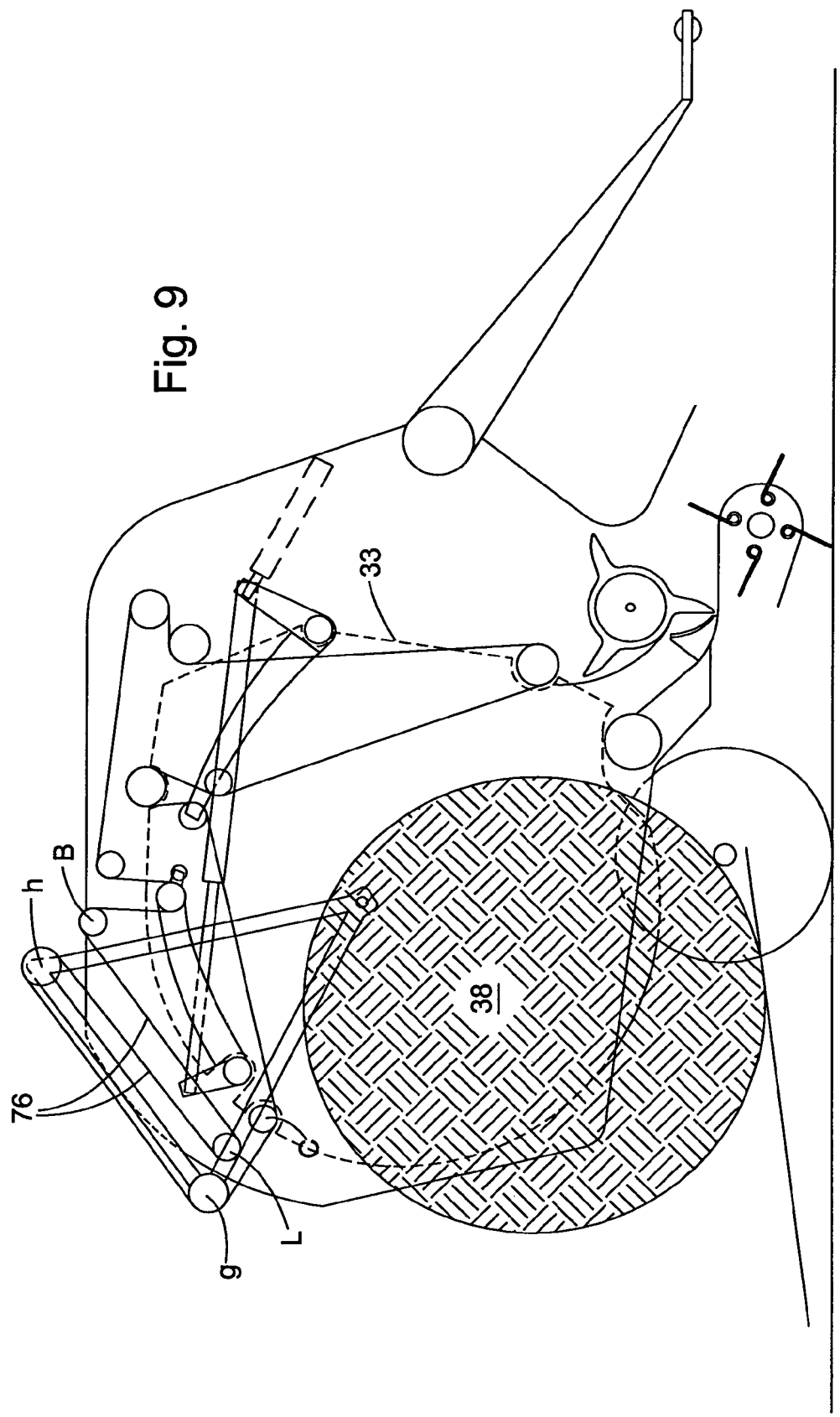

ROUND BALER

BACKGROUND

1. Field of the Invention

This invention relates to a round baler having side structures, fixed rolls, at least two moveable pivot arms carrying mobile rolls, and an endless flexible bale-forming arrangement and routed over the rolls to create, and encompass, a cylindrical circumference of a bale chamber.

2. Related Technology

European Patent specification EP 309 936 B1 discloses a round baler with a single set of endless belts, which are routed over a series of fixed and mobile rolls, whereas the mobile rolls are carried on two tensioning arms, which create several loops to provide sufficient belt length to extend over the circumference of a completed bale. A lower tensioning arm is applied by a spring, which extends with additional crop entering the bale chamber.

EP A1 309 941 discloses a round baler with two sets of endless belts and two tensioning arms, which are controlled by means of a single hydraulic cylinder. This hydraulic cylinder is used to control the tension in the two sets of belts to provide for controlled movement of the bale during formation and unloading.

EP A1 308 078 discloses a round baler with side structures and mobile as well as fixed rolls. A single tensioning arm is provided in about the center of the bale chamber to create a loop taking up the slack in the belts, when the bale chamber is empty. Another loop is formed by an unloading pivot frame, when it is moved to an unloading position.

EP A1 308 079 teaches a round baler with side structures and mobile and fixed rolls. A single tensioning arm is provided in the front area of the round baler to release more or less of a loop of the belts to the circumference of a growing bale. A tensioning roll acts on the belts. The tensioning arm is provided with a pair of parallel rolls, which guide two strands of the belts and limit the bale chamber in its upper region. Another loop is formed by an unloading pivot frame, when it is moved to an unloading position.

The problem this invention is based on is seen in the challenges of forming bales with a bigger diameter, such as two meters or greater, whereas belts, chains or the like and their control means should be kept at a minimum to keep costs low.

SUMMARY

In the present invention, a second tensioning arm is configured totally or in part in an overlapping relationship to the potential bale chamber, as considered in side view for example when the bale chamber is filled, the tensioning arm does not extend over the boundary of the round baler. Additionally, the tensioning arm will not hit an obstacle or move in an unwanted direction; nor will it occupy space in the front part of the round baler, which is needed to install a net wrapping and/or tying device. The flexible bale-forming arrangement may include a set of individual bale-forming elements like flexible belts, but instead may include a chain and slat assembly or a single belt.

When an unloading pivot frame is used to release the bale from the bale chamber, it can at the same time form a loop to take out the slack from the baling element. Such a loop or such loops may be generated by one roll hitting a length or strand of the bale-forming arrangement extending between two other rolls. The one roll may be a fixed roll or it may be one on the unloading pivot frame which contacts a span of the bale-forming arrangement extending between a fixed roll and a mobile roll also on the unloading pivot frame.

While not required, a rotary actuator, a linear actuator, or preferabvly a hydraulic cylinder, can be used. The hydraulic cylinders may apply more power and are easier to connect. Hydraulic and electric driven actuators are easy to control and available on round balers driven by a tractor. By using only one common control for the two or more tensioning arms, as opposed to a spring or another control, the costs are kept lower than by using more of them. In a case, where three tensioning arms are present, pairs of two may be connected and controlled by a common link, cable, or the like. The actuator may be driven hydraulically or electrically and may join the tensioning arms directly or via links, cables, chains.

Resistance in the bale-forming arrangement, against which the tensioning arm is urged by the actuator being extended or retracted, will result in tension in the bale-forming arrangement and this will create a dense bale. Such resistance may be variable during the baling process to provide a dense bale throughout its diameter or a soft core at the beginning and a dense bale later on.

By using lever arms to connect the actuator to the tensioning arms, it is possible to select their position with respect to the tensioning arm such that the momentum can be transferred best. Another advantage is seen in the possibility to control the sense of rotation of the tensioning arms, which allows for adjustment to given structural restrictions, like rolls or struts crossing the pat of the tensioning arms.

When either tensioning arm moves through the bale chamber, it can assist the bale movement during unloading or at least avoid bale movement when the bale rolls back. In order to provide for stability in the bale control means, it is helpful to use another actuator to control the entire tensioning system, stability assures that both tensioning arms do not move in an unwanted way when certain baling conditions appear or to keep the whole tensioning system in a certain position when springs or other forces apply.

In one embodiment, two mobile rolls are included on one tensioning arm. Having two mobile rolls on a tensioning arm enables the creation of more loops for controlling the size of the bale chamber by releasing more or less bale-forming arrangement length.

A second tensioning arm having legs located outside the bale chamber may pivot in a bigger region, since no fixed rolls or mobile rolls in the bale chamber will cross their path. When the second tensioning arm is provided with mobile rolls at its ends, bale-forming arrangement lengths or strands running over rolls at the ends will not be damaged or exposed to friction.

In one embodiment, the actuator is not fully retracted when the bale formation process starts and may release the bale-forming arrangement length in a first movement and may take slack out of the bale-forming arrangement in a second movement.

When the tensioning arms rotate in the same or opposite directions during bale formation or subsequent to it, they may avoid running into each other, or may be able to use a common actuator, etc.

In another embodiment, a second fixed roll is provided adjacent the first fixed roll and in which the second roll is located within the radial extension of the unloading pivot frame. Thus, it is possible to create more than one loop and take up more slack or at least the same slack but with less movement and space required.

In yet another embodiment, an unloading pivot frame is provided with three mobile rolls, whereas the bale-forming arrangement is routed between them, the bale-forming arrangement and thus the bale chamber can be controlled and another loop can be created.

BRIEF DESCRIPTION OF THE DRAWINGS

FIG. 1 shows a schematic right side view of a round baler according to a first embodiment having two pivot arms controlled by a single, actuator with the baler being shown in an empty stage;

FIG. 2 is a partial front view, with the bale-forming arrangement removed for clarity, of the round baler shown in FIG. 1.

FIG. 3 shows the round baler of FIG. 1 with a completed bale;

FIG. 4 shows the round baler of FIG. 1 with a completed bale after unloading;

FIG. 9 shows the round baler of FIG. 8 with a completed bale during unloading.

DETAILED DESCRIPTION OF THE DRAWINGS AND THE PRESENTLY PREFERRED EMBODIMENTS

Figure 5:
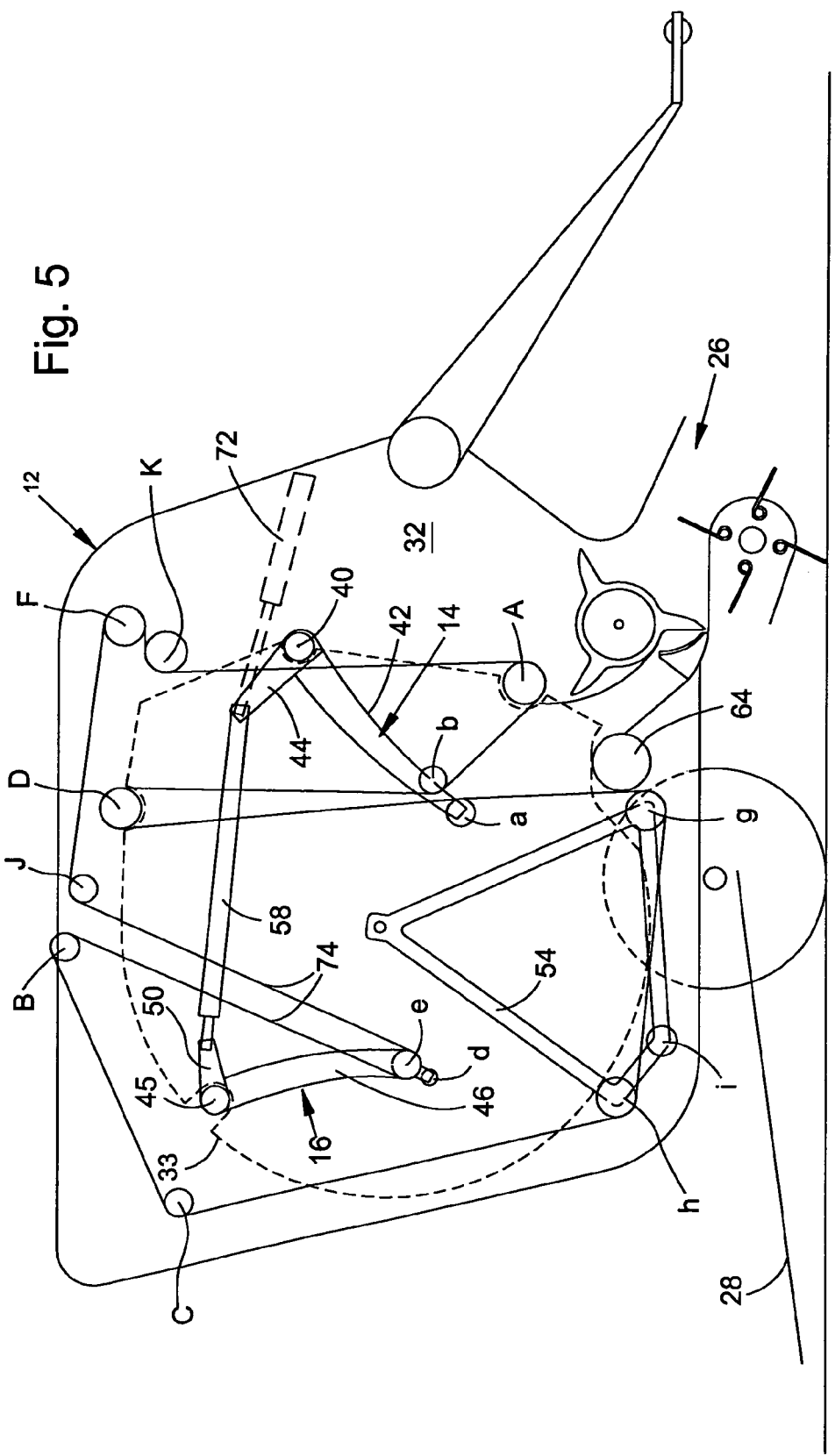
FIG. 5 shows a schematic side view of a second embodiment of a round baler, in an empty condition, having two tensioning arms controlled by a single actuator.

FIG. 1 shows a round baler 10 having a chassis 12, a first tensioning arm 14, a second arm 16, fixed rolls 18, mobile rolls 20, a flexible bale-forming arrangement 22, a bale forming arrangement control 24, a feeding mechanism 26 and an unloading mechanism 28.

This round baler 10 is of the variable chamber type and is pulled behind a tractor or the like (not shown) over a field to pick up crop and to form cylindrical bales 38 thereof, as this is known in general. Although it is not shown, this round baler 10 may comprise a twine, net or plastic wrapping system, known as well. Alternatively, the round baler 10 may be part of a self-propelled vehicle.

Referring now also to FIG. 2, it can be seen that the chassis 12 includes a wheeled axle 30, side structures including an outer pair of transversely spaced side walls 32, to which an inner pair of transversely spaced walls 33 are respectively attached, and a tongue 34. The wheeled axle 30 may be of the single rigid axle type, as shown, or of the tandem axle type with or without spring suspension. Each pair of side walls 32 and 33 of the side structures is oriented vertically, carried by the wheeled axle structure 30 and forms the round baler 10 with the side walls 32 and 33 at each side being spaced from each other in the lateral direction. Such side structure are disclosed in more detail in EP 1 264 531, but this invention is not limited to a use with such design. In this invention, the side structures are not split in the area of a bale chamber 36 formed between them. The side structures stay in place, when a formed bale 38 is ejected, as opposed to side structures in the prior art, of which a rear portion is lifted during unloading the bale 38. While in general the inner side walls 33 could be an integral part of the outer side 32, they are shown in the following embodiments as separate parts, which are attached to the side walls 32 and assume as their only function to define opposite, laterally spaced ends of the bale chamber 36. Unlike in the prior art, they are not split in halves and do not or only slightly extend beyond the silhouette of a completed bale 38. If such separate walls 33 are present, the pivot arms 14 and 16 and the fixed rolls 18 are carried by the outer side walls 32. The tongue 34 is fixed to the side structures, as this is known, to connect the round baler 10 to the tractor (not shown). The distance between the respective side walls 32 and 33 at the opposite sides of the baler 10 may be mounted so as to be adjustable during operation.

The first tensioning arm 14 is located between the outer pair of side walls 32 and assumes substantially the form of an "U". The base of the "U" of the first pivot arm 14 is journalled on an axis 40 oriented horizontally and transverse to the travel direction of the round baler 10 and is fixed with respect to the side walls 32. The axis 40 is located approximately one third of the length of the side walls 32 from the front and one third of the height of the side walls 32 from the top. The legs 42 of the "U" of the first tensioning arm 14 extend parallel to the side walls 32 or 33 and are pivotable in a vertical direction between a 7:00 o'clock (bale start position) and an 11:00 o'clock (full bale position), when viewed from the right hand side, shown in the drawing. The length of the legs 42 reaches almost half of the height of the side structure, i.e., they terminate substantially close to a line between a fixed roll D and a mobile roll g, when an unloading pivot frame is in its lower position. Rigidly connected to the legs 42 or to the base of the "U" is at least one lever arm 44.

The second tensioning arm 16 is of similar "U" construction as the first tensioning arm 14, whereas an axis 45 for the end regions of legs 46, remote from the base of the "U" is located at about half way of the length of round baler 10 (without tongue) the close to the roll D, in the upper region, but slightly below and behind it. The legs 46 extend outside the bale chamber 36, i.e., they face, and extend radially beyond, the outer surfaces of the inner pair of side walls 33 and terminate approximately at the front upper corner of the round baler 10. At the end region close to the axis 45, lever arms 50 are fixed to the legs 46 and extend substantially perpendicular therefrom. At the end remote from the axis 45, the legs 46 are connected by one of the mobile rolls 20, which defines the base of the "U". The legs 46 may pivot in a range between a 1:00 o'clock position (unloading the bale) over a 2:00 o'clock position (bale start position) and a 4:00 o'clock position (full bale position). They run parallel to the side walls 32 and 33 and are pivotable in a vertical direction.

Fixed rolls 18 have end portions being rotatably journalled in, or at, the outer pair of side walls 32, whereas they all run parallel to each other and parallel to the ground on which the round baler stands. Depending on the chosen embodiment, more or less fixed rolls 18 may be present, whereas most of them are of the same design. A roll body may be journalled on a shaft or stub shaft or a roll body with fixed stub shafts rotatably received in bearings (not shown) in side walls 32. However, the diameter of the rolls 18 may be different from roll 18 to roll 18. It is obvious that "fixed" means, that their position is fixed, whereas the rolls 18 as such can rotate. For the sake of the ongoing description, the fixed rolls 18 are designated by capital letters "A" and "C" to "I", whereas:

"A" refers to a fixed roll 18 located slightly above an inlet 52 to the bale chamber 36 and above and close to the feeding mechanism 26;

"C" refers to a fixed roll 18 in the upper rear corner area of round baler 10;

"D" refers to a fixed roll 18 located close to the upper edge of the side walls 32 and in a region about half way between front and rear edges of the side walls 32;

"E" refers to a fixed roll 18 also located close to the upper edge of the side structure 32, but slightly forward of the fixed roll 18 referenced by D;

"G" refers to a fixed roll 18 located close to a place where the tongue 34 meets the side walls 32, i.e., half way of the height of the side walls 32 and close to their front edges;

"H" refers to a fixed roll 18 nearby the axis 40 about which the first tensioning arm 14 swings and located above and rearward of roll G0; and "I" refers to a fixed roll 18 located very close to fixed roll 18/H, but directly above it.

At least one of the fixed rolls 18 is driven and formed such that it may transfer movement energy from this driven roll 18 to the bale-forming arrangement 22.

The mobile rolls 20, i.e., those, the position of which may vary during the baling process, extend parallel to the fixed rolls 18 and are of comparable design. The mobile rolls 20 are designated by small letters, "a", "b", and "e" to "j", whereas:

"a" refers to a mobile roll 20 located in the end region (remote from the axis 40) of the legs 42 of the first tensioning arm 14;

"b" refers to a mobile roll 20 mounted to the legs 42 of the first tensioning arm 14 at a location close to, and spaced toward the axis 40 from, the mobile roll 20/a;

"e" refers to a mobile roll 20 located in the end region (remote from the axis 46) of the legs 46 of the second tensioning arm 16;

"g" refers to a mobile roll 20 located in a lower rear corner area (as seen in FIG. 1) of unloading pivot frame 54;

"h" refers to a mobile roll 20 located in a lower rear corner area (as seen in FIG. 1) of the unloading pivot frame 54;

"i" refers to a mobile roll 20 located between the rolls g and h, but close to h and slightly below a line through rolls g and h of the unloading pivot frame 54; and "j" refers to a mobile roll 20 located very close to, above and forward of, roll g, where this mobile roll j is not needed if a mobile roll g having a big diameter is used instead.

The unloading pivot frame 54 has substantially the form of a triangle, as considered in side view, an upper corner (as seen in FIG. 1) of which is journalled about an axis 56, parallel to the axes 40, 45 and close to the center of bale chamber 36, when being filled, the rear lower corner of the unloading pivot frame 54 then being in the rear lower corner area of the outer side walls 32, and the front lower corner area of the unloading pivot frame 54 being located immediately behind a lower roll 64 to be described later and is illustrated in FIG. 1.

The bale-forming arrangement 22 in this embodiment is formed by a set of belts, running parallel to each other in laterally spaced relationship. Alternatively, a single endless belt or a chain and slat conveyor could be used to provide for flexibility, allowing the bale-forming arrangement 22 to run over the rolls 18 and 20. The routing of the bale-forming arrangement 22 is described in the following with respect to the embodiment and mode of operation as shown in FIG. 1.

Starting from fixed roll A and proceeding in a direction of travel of the bale-forming arrangement 22 during formation of a bale, the routing of the bale-forming arrangement 22 is: to H, H to G, G to e, e to I, I to E, E to C, C to h, h to g by way of a route which passes between h and I, g to j, j to a by way of a route which passes between a and b, and from b back to A. In this routing, a loop 70 is formed by the length of the bale-forming arrangement 22 extending between rolls I and G, as the bale-forming arrangement 22 is routed over roll e. Another loop —no reference no.—is formed about roll D, whereas its size decreases with the growing bales and is determined by the position of the mobile rolls a and b.

The bale-forming arrangement control means 24 is composed of various (not shown) pump, sump, valves, sensors, lines, a CPU, etc. and for the tensioning arms 14, 16 one actuator 58 extending between and pivotally fixed to lever arm 44 of the first tensioning pivot arm 14 and lever arm 50 of the second tensioning arm 16. The control means 24 receives and computes signals coming from the various round baler components as well as from an operator. The output signals of the CPU controlling the actuator 58 are such that during bale formation a certain resistance acts onto the tensioning arms 14 and/or 16 to provide for a wanted density in the bale 38 and that after unloading the bale 38, the tensioning arms arms 14, 16 return to their initial bale starting position. The actuator 58 of this embodiment is in the form of a single or double acting linear hydraulic motor; alternatively, it could be an electric motor.

As shown in FIGS. 1–3, and different from the subsequent embodiments, actuator 58 is used to control the respective positions of the first and second tensioning arm. This is possible, since the forces applying both tensioning arms 14, 16 are quite balanced. Alternatively to the use of an actuator 58 in the form of a hydraulic cylinder attached directly to the tensioning arms 14, 16 or their lever arms 44, 50, one could use a hydraulic cylinder for one direction and a spring for a movement in the other direction, or one could use a strong spring only, like a coil spring, or one could use an electric or pneumatic motor, or one could apply the actuator—being in the form of a hydraulic cylinder, of a spring, or of a motor—via a cable or linkage to both arms 14, 16 or directly to one of the arms 14, 16 and via a cable or link to the other arm 16, 14. This applies as well to the subsequent embodiments, in which more than one actuator is used. The unloading pivot frame 54 is raised, and if need be, lowered by an unshown hydraulic actuator, which is controlled as well by the bale-forming arrangement control means to achieve a synchronized movement.

The feeding mechanism 26 includes a pick-up 60, downstream thereof a conveyor 62 formed as a cutting unit, a converging auger or other transport mechanism and in the area of the inlet 52 the bottom roll 64, which all together assist in taking crop from the ground and delivering it through the inlet 52 into the bale chamber 36, where it is rolled into m. a bale 38.

The unloading mechanism 28 is formed as a ramp, either remote controlled or spring loaded, on which the unloaded bale 38 rolls down onto the ground. Having described the structure of the round baler 10 so far, its function is as follows, starting from the situation in FIG. 1.

In FIG. 1, spans or lengths of the bale-forming arrangement 22 between rolls a and j, as well as between rolls b and A, form two sides of the bale chamber 36, which is kept minimal, since pivot arm 14 is in its lowest, 7:00 o'clock position. Roll j lies adjacent to the bottom of roll 64, since the unloading pivot frame 54 assumes its lowest position, which brings the span between rolls a and j into a nearly vertical orientation. The actuator 58 assumes its minimal length and first pivot arm 14 assumes its lowest location, while the second pivot arm 16 is approximately in the 2:00 o'clock position.

When crop is fed continuously through the inlet 52, a bale 38 will start to grow and push pivot arm 14 upward thereby extending actuator 58 against a force provided by a resistance in the baling control means 24, for example created by a nozzle, a valve or the like. Simultaneously, pivot arm 16 will be pulled downwardly by the bale-forming arrangement 22 shortening the span between rolls G and I, and hence the length of the loop 70, in order to adjust to the growing circumference of the bale 38. Both pivot arms 14, 16 rotate clockwise. Movement of the pivot arms 14, 16 and thus also of the mobile rolls a, band e is continuous until the bale 38 has reached its desired or maximum size, as shown in FIG. 3. When the bale chamber 36 is full, the pivot arm 14 will have reached its highest position and the pivot arm 16 will have reached its lowest position, in which the first pivot arm 14 follows approximately the circumference of the bale 38. Accordingly, the actuator 58 will have extended to its maximum length. The unloading pivot frame 54 and the rolls g to j are still in their lower positions and together with the bale-forming arrangement 22 support the bale 38. Since the second pivot arm 16 moves towards fixed roll G, the loop 70 shortens close to non-existence.

In order to unload the bale 38, the unloading pivot frame 54 is pivoted clockwise about axis 56 into the position shown in FIG. 4, in which a line through the center of each of the rolls g and h shows an inclination to the ground of about 30 degrees. Due to the upward movement also, roll i moves upwardly and hits the span between rolls g and C. Roll i creates a loop 6 as shown in FIG. 4 to take out slack in the bale-forming arrangement 22, which appears as soon as the bale 38 rolls down the unloading mechanism 28. As soon as the bale 38 has left the baling chamber 36, the second pivot arm 16 moves upward in a counter clockwise direction, thereby enlarging the loop 70 to the biggest possible extent. Afterwards, both pivot arms 14, 16 move down and finally the situation shown in FIG. 1 is reached again.

Figure 6:
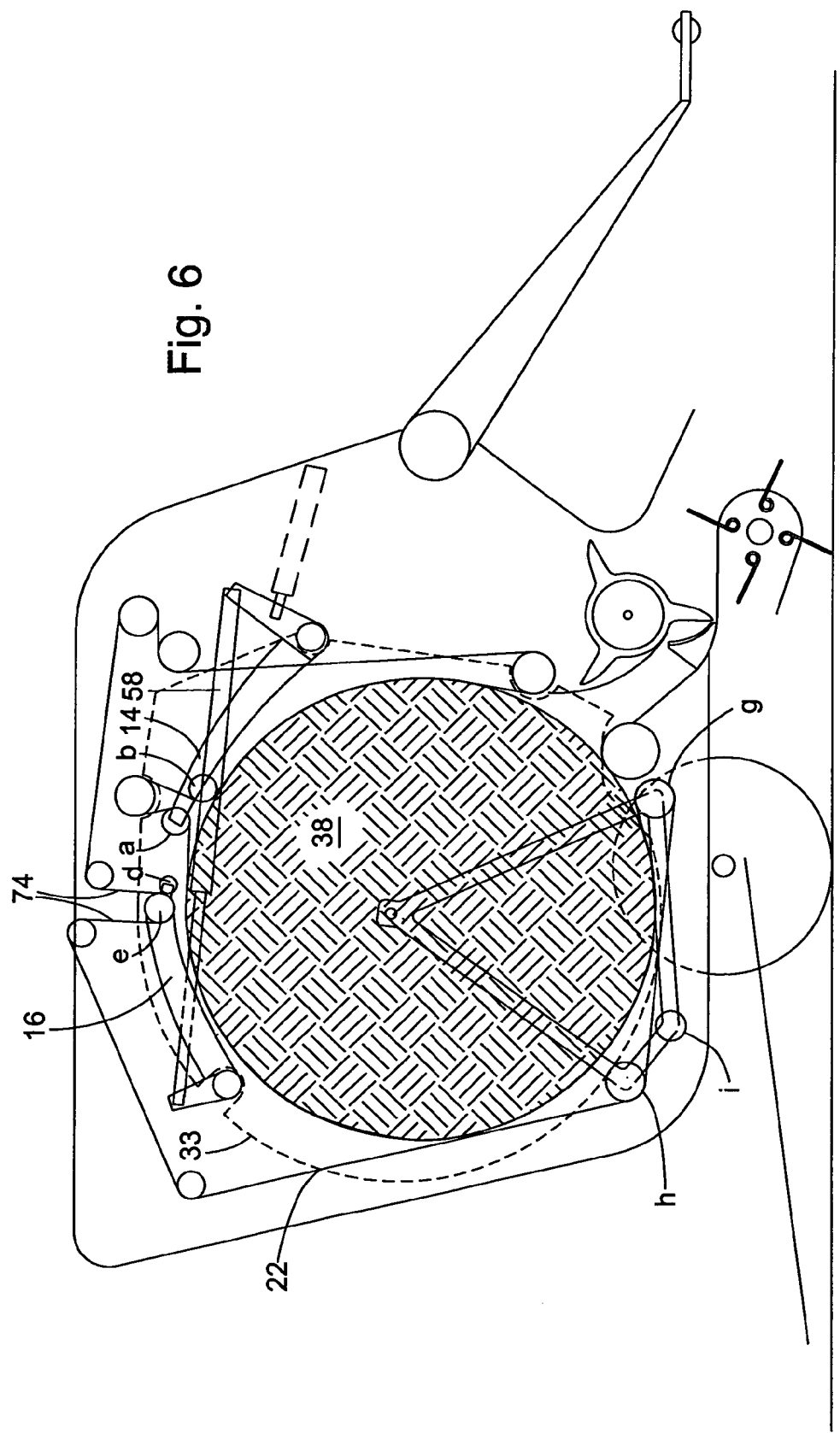
FIG. 6 shows the round baler of FIG. 5 with a completed bale.
Figure 7:
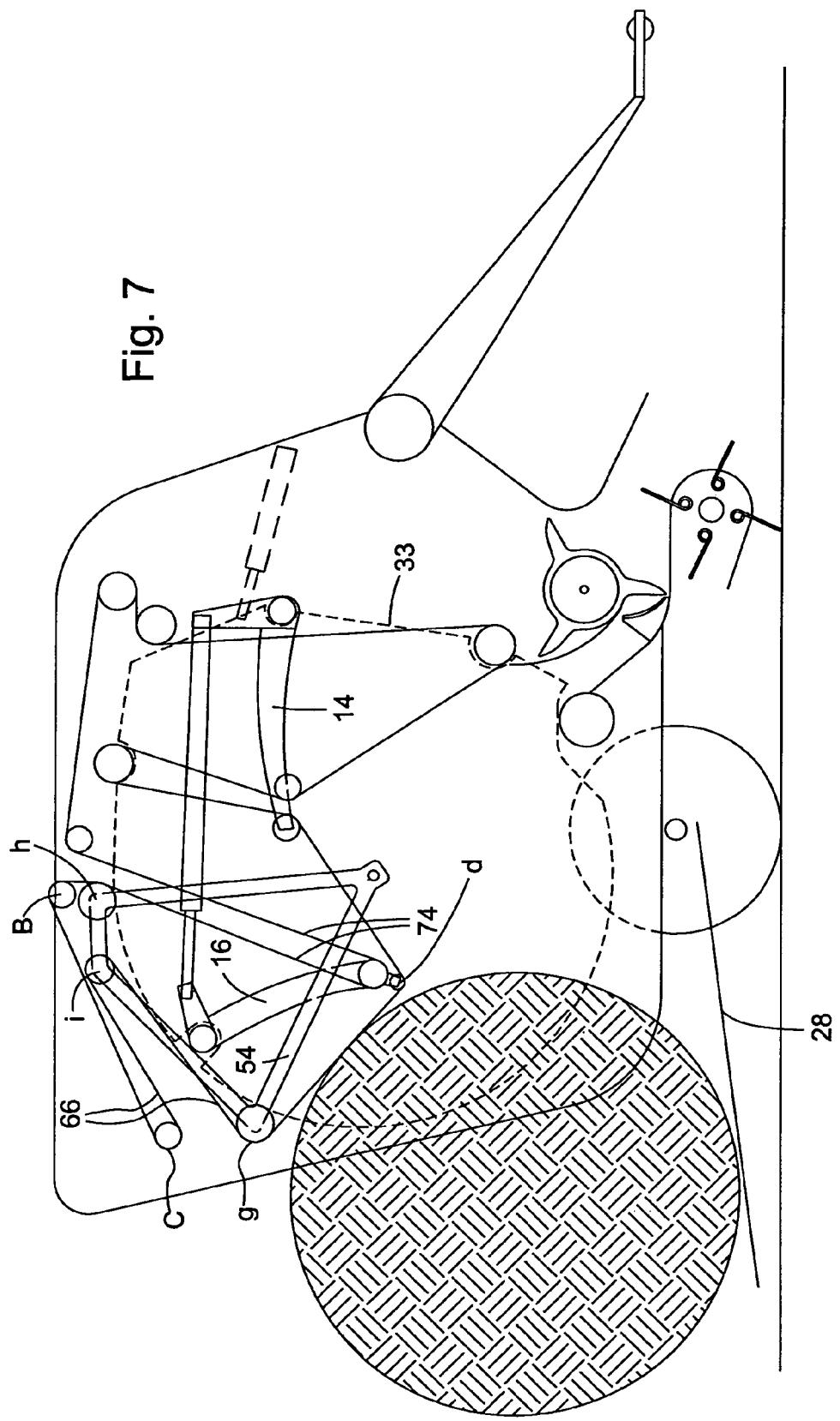
FIG. 7 shows the round baler of FIG. 6 with a completed bale during unloading.

FIGS. 5–7 show a second embodiment having many components in common with the first embodiment, especially one actuator 58 for two tensioning arms 14, 16. The purpose of the round baler 10 and the design of its chassis 12 are the same or equivalent to that of the first embodiment. The first tensioning arm 14 has the same design and is located and journalled in a similar or identical way. In particular, it has lever arms 44, to which actuator 58 is connected.

The second tensioning arm arm 16 is different from the one of the first embodiment in some respects. The second tensioning arm 16 of the second embodiment is journalled on axis 45, which is located in the wider area of the rear upper corner of the outer pair of side walls 32 and close to the roll C. The legs 46 extend inside the maximum shape of the baler chamber 36, and terminate slightly below the middle of the height of the side walls 32. When the bale chamber 36 is empty, as this is shown in FIG. 5, the legs 46 run substantially vertical, whereas axis 45 is situated on top of the legs 46. At the end region close to the axis 45, lever arms 50 are fixed to the legs 46 and extend substantially perpendicular therefrom. At axis 45, the legs 46 are connected by the base of the "U". The legs 46 may pivot in a range between a 6:00 and 2:00 o'clock pointer position.

During operation, both tensioning arms 14, 16 rotate in opposite directions i.e., as viewed, the first tensioning arm 14 rotates clockwise and the second tensioning arm 16 rotates counter clockwise, each when the bale 38 is growing.

Fixed rolls A, C and D are in the same or substantially the same position as those of the first embodiment. However, fixed rolls B, F, J and K are added, which are located at different places. Rolls B and J are arranged very close to each other and between fixed rolls C and D, However slightly above a line extending through the centers of the rolls C and D and thus close to the upper edge of the outer pair of side walls 32. Rolls F and K are arranged in the wider front upper corner area of the side walls 32. Rolls F and K are located very close to each other, whereas roll K is offset with respect to roll F to the rear and below it. This roll K is provided to increase the amount of wrap around the drive roll F and to move the respective strand of the bale-forming arrangement 22 out of contact with the first tensioning arm 14 between its legs 42.

Again only rolls a and b are provided on first tensioning arm 14. Second tensioning arm 16 now bears the two mobile rolls d and e at the end of remote from axis 45, whereas mobile roll d forms the end of the second tensioning arm and its direct linear extension, while roll e is situated radially inward from roll d on the second tensioning pivot arm 16. Roll e forms the idling roll, while roll d is used to avoid interference as this will be described later. Rolls g, h, and i are present on the unloading pivot frame 54, of the second embodiment, but not mobile roll j; instead of mobile roll j, mobile roll g has a bigger diameter.

The flexible bale-forming arrangement 22 is equivalent to the one in the first embodiment. The baling control means 24 contains again one actuator 58 between the lever arms 44 and 50, whereas said actuator 58 is joined to these lever arms 44, 50 above the axes 40, 45, when the round baler 10 assumes the position shown in FIG. 5, i.e., when the bale chamber 36 is empty. In addition to the baling control means 24 of the first embodiment, a second actuator 72 is possibly provided, which at one end is fixed to the chassis 12 or the outer side walls 32 and which at its other end is connected to the arm 44, where the first actuator 58 is connected applies to it.

It should be understood for this, as wall as for the third embodiment, that more than one actuator 58 can be used, whereas one may be provided on each side of the round baler 10. The same is true for the second actuator 72. While the first actuator 58 is used to control the relative movement between the two tensioning arms 14, 16 as in the first embodiment, the second actuator 72 can be used to control their positions particularly to synchronize displacement of pivot arm 16 in relation to the bale position during its ejection and to take advantage of the tensioning arm 16 position to positively push the bale 38 out. It is made clear hereby, that mostly the second actuator 72 is an option.

As concerns the second embodiment, the feeding mechanism 26, the unloading mechanism 28, the unloading pivot frame 54 (except for using the larger roll g in lieu of small roll g and roll i) and the bottom roll 64 are similar or identical to those of the first embodiment.

All in all and starting again from fixed roll A, the routing of the bale-forming arrangement 22 is to K and between K and F, around F, then to J, J to and around e between e and d, from e to B, then from B to and around C, from C to and around h, going between h and i, then to and about g, then from g to a, along a path passing between a and b, then to and around D, then back to b along a path passing between a and b, and then from b to and around the beginning roll A. In this routing, another loop 74 is formed by a length of the bate-forming arrangement 22 extending between the rolls B and J, as the bale-forming arrangement 22 is routed over roll e. This loop 74 is used instead of the loop 70 formed about the roll e in the first embodiment.

Bale formation starts when the round baler 10 assumes the position as shown in FIG. 5. In this position the first and second tensioning arms 14, 16 assume their respective lowest positions. The first actuator 58 is retracted or shortened to its minimum; the second actuator 72 is extended to its maximum. The bale chamber 36 has the smallest dimension and is substantially triangular in shape.

When crop is fed continuously through the inlet 52, a bale 38 will start to grow and push tensioning arm 14 clockwise upwardly, as viewed, thereby extending actuator 58 against a force provided by resistance in the baling control means 24, for example created by a nozzle, a valve or the like. Simultaneously, tensioning arm 16 will be pulled upwardly by the flexible bale-forming arrangement element 22, however counter clockwise, thereby shortening the loop 74 in order to adjust to the growing circumference of the bale 38. Movement of the tensioning arms 14, 16 and thus also of the mobile rolls a, b, d and e continues until the bale 38 has reached its desired or maximum size, as shown in FIG. 6. When the bale chamber 36 is full, both tensioning arms 14, 16 will have reached their highest positions, in which their longitudinal axes extend like a roof and under angles of about 20 degrees; both follow approximately the circumference of the bale 38. Accordingly, the actuator 58 has been extended to its maximum length. The unloading pivot frame 54 and the rolls g to i are still in their lower positions and together with the bale-forming arrangement 22 support the bale 38. The second actuator 72 is retracted or shortened to its minimum length.

In order to unload a bale 38, the unloading pivot frame is pivoted clockwise about axis 56 into the position shown in FIG. 7, in which a line through the center of rolls g and h shows an inclination to the ground of about 30 degrees. Due to the upward movement, also roll i moved upwardly and hit the length of the bale-forming arrangement 22 spanning the gap between rolls g and C. Roll i creates a loop 66 (FIG. 6) to take out slack in the bale-forming arrangement 22, which appears, as soon as the bale 38 rolls down the unloading mechanism 28. As soon as the bale 38 has left the bale chamber 36, the second tensioning arm 16 moves downward in a clockwise direction, thereby enlarging the loop 74 to the biggest possible extent and driving the bale 38 out. In this situation, mobile roll d prevents the length of the bale-forming arrangement 22, extending between rolls g and d, from contacting the loop 74. Afterwards, or simultaneously, actuator 72 extends again, with the first tensioning arm 14 moving down and finally the situation shown in FIG. 5 is reached again.

Figure 8:
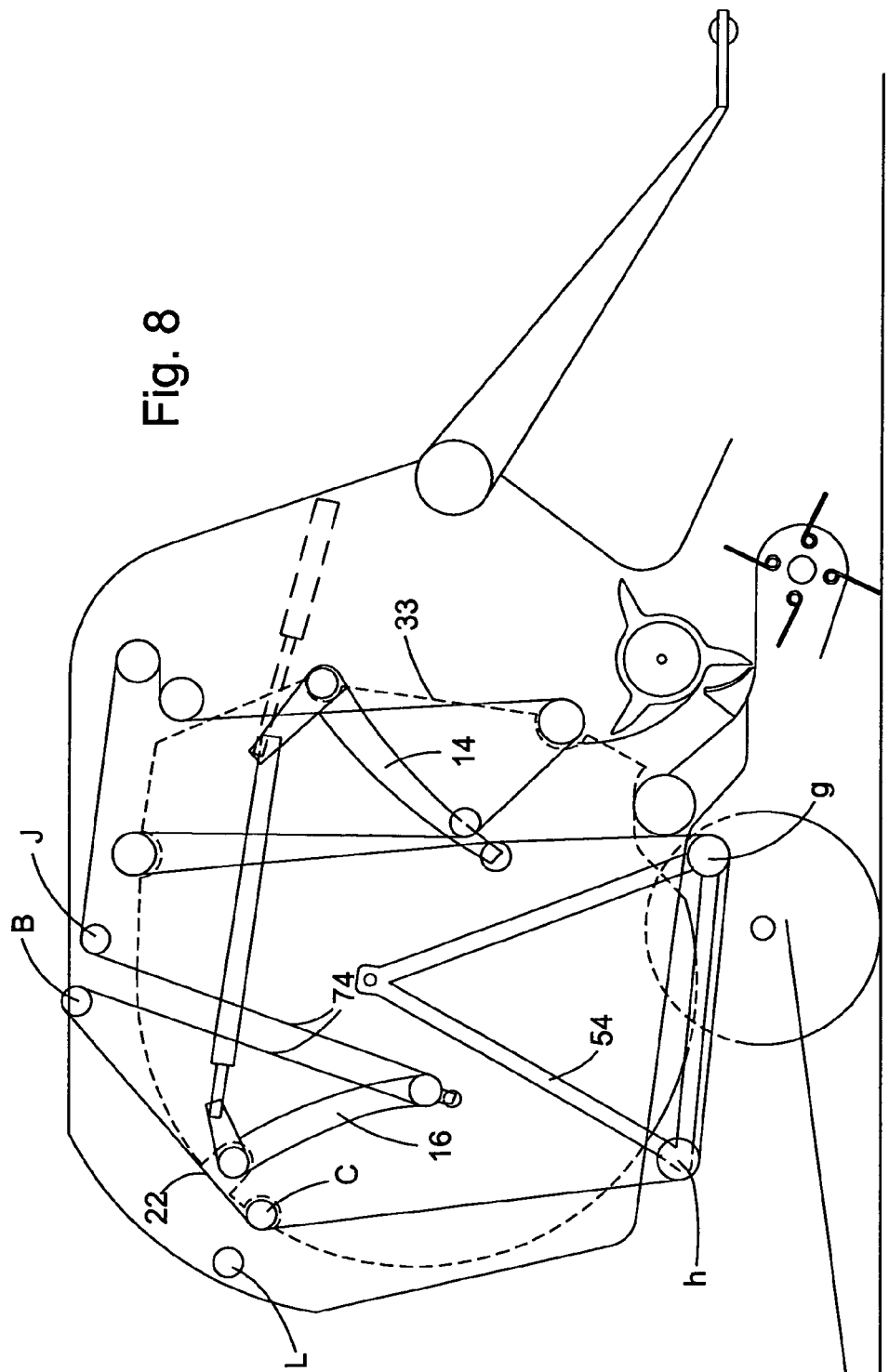
FIG. 8 shows a schematic side view of a third embodiment of round baler, in an empty condition, having two tensioning pivot arms controlled by a single actuator.

FIGS. 8 and 9 illustrate a third embodiment being different from the second embodiment insofar, as the unloading pivot frame 54 has rolls h and g only and as a fixed roll L is added very close but slightly above and rearward of fixed roll C, whereas the bale-forming arrangement 22 is routed through the gap between the fixed rolls L and C. Furthermore, the unloading pivot frame 54 is located outside the outer pair of side walls 32. The remainder of the round baler 10 including the routing of the bale-forming arrangement 22 and the use of a first and a second actuator 58 and 72 is identical.

The function during forming a bale 38 is identical to the function in the round baler 10 of the second embodiment. When a finished bale 38 is unloaded and the unloading pivot frame 54 is raised, a loop 76 is formed in the length of the bale-forming arrangement 22 extending between the rolls and B when said length hits the fixed roll L. This loop 76 is created to take out slack in the bale-forming arrangement 22, which appears, as soon as the bale 38 rolls down the unloading mechanism 28. Loop 76 is used instead of loop 66 appearing in FIG. 7.

It is therefore intended that the foregoing detailed description be regarded as illustrative rather than limiting, and that it be understood that it is the following claims, including all equivalents, that are intended to define the spirit and scope of this invention.

The invention claimed is:

1. A round baler having fixed side structures carrying a plurality of fixed rolls, two moveable tensioning arms each carrying one or more mobile rolls, and a flexible bale-forming arrangement creating one endless circle, as considered in side view, and routed over said fixed and mobile rolls to define and encompass a bale chamber, comprising:
   a first tensioning arm of said two moveable tensioning arms being vertically pivotally mounted to said side structures and carrying first and second mobile rolls for guiding said flexible bale-forming arrangement over a first of said fixed rolls carried by said side structures; and
   a second tensioning arm of said two moveable tensioning arms carrying a third mobile roll acting on a strand of said bale-forming arrangement extending between second and third fixed rolls of said plurality of fixed rolls, an actuator being coupled directly between said first and second tensioning arms for controlling the movement of the first and second tensioning arms, wherein said second of said two moveable tensioning arms, as considered in side view with said bale chamber being full, at least partially overlaps said bale chamber.

2. The round baler of claim 1, further comprising:
   an unloading pivot frame mounted to said side structures for pivoting vertically between a lowered baling position and a raised unloading position; said unloading frame further carrying at least a fourth mobile roll engaged by said flexible bale-forming arrangement;
   a fourth fixed roll of said plurality of fixed rolls being located adjacent to a path followed by said unloading pivot frame when moving between said lowered baling and raised unloading positions; and
   said fourth mobile roll being so located relative to said fourth fixed roll that a strand of said bale-forming arrangement is engaged by said fourth mobile roll and looped about said fourth fixed roll by moving the unloading pivot frame between said lowered baling position and raised unloading position.

3. The round baler of claim 1 wherein said actuator is a hydraulically driven linear motor.

4. The round baler of claim 1 wherein said actuator is an electrically driven linear motor.

5. The round baler of claim 1 wherein the actuator acts against a resistance force applied to the actuator as the bale chamber is filled.

6. The baler of claim 1 wherein said first and second tensioning arms are respectively provided with first and second lever arms so disposed relative to said first and second tensioning arms and said actuator that said tensioning arms are caused to undergo a first direction of rotation as the bale chamber is filled.

7. The baler of claim 1 wherein said first and second tensioning arms are respectively provided with first and second lever arms so disposed relative to said first and second tensioning arms and said actuator that said first and second tensioning arms are caused to undergo rotation in opposite first and second directions as the bale chamber is filled.

8. The round baler of claim 1 wherein said second tensioning arm further comprises a pair of legs respectively disposed on opposite sides of said side structures from said bale chamber.

9. the round baler of claim 1 wherein said actuator is an extensible and retractable hydraulic actuator which extends during bale formation.

10. The round baler of claim 1 wherein said first and second tensioning arms rotate in a first direction during bale formation.

11. The round baler of claim 1 wherein said first and second tensioning arms rotate in opposite directions during bale formation.

12. The round baler of claim 2 wherein said plurality of mobile rolls further includes a fifth mobile roll mounted to said unloading pivot frame at a location adjacent said fourth mobile roll and said bale-forming arrangement being disposed between said fourth and fifth mobile rolls.

* * * * *